(12) United States Patent
Watanabe et al.

(10) Patent No.: US 10,994,750 B2
(45) Date of Patent: May 4, 2021

(54) VEHICLE CONTROL DEVICE

(71) Applicant: HONDA MOTOR CO., LTD., Tokyo (JP)

(72) Inventors: Takashi Watanabe, Wako (JP); Hisashi Matsuda, Wako (JP); Kentaro Ishisaka, Wako (JP); Takafumi Hirose, Wako (JP); Toru Kokaki, Wako (JP); Katsuya Yashiro, Wako (JP); Takemi Tsukada, Wako (JP); Masaya Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 16/750,793

(22) Filed: Jan. 23, 2020

(65) Prior Publication Data
US 2020/0239027 A1 Jul. 30, 2020

(30) Foreign Application Priority Data

Jan. 24, 2019 (JP) .............................. JP2019-009848

(51) Int. Cl.
*B60W 60/00* (2020.01)
*B60W 50/14* (2020.01)
*G05D 1/00* (2006.01)

(52) U.S. Cl.
CPC ........ *B60W 60/0053* (2020.02); *B60W 50/14* (2013.01); *G05D 1/0061* (2013.01); *G05D 1/0088* (2013.01); *B60W 2520/10* (2013.01); *B60W 2554/406* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 5,774,069 A | 6/1998 | Tanaka et al. | |
| 9,588,517 B2 * | 3/2017 | Laur | B60W 50/082 |
| 9,606,536 B2 * | 3/2017 | Sato | B60W 50/14 |
| 10,558,213 B2 * | 2/2020 | Sato | G05D 1/0088 |
| 10,684,620 B2 * | 6/2020 | Park | B60W 40/09 |
| 10,759,445 B2 * | 9/2020 | Matsumoto | B60W 60/0059 |
| 10,843,710 B2 * | 11/2020 | Seo | B60W 50/082 |

(Continued)

FOREIGN PATENT DOCUMENTS

| | | | | |
|---|---|---|---|---|
| JP | 3239727 B2 | 12/2001 | | |
| WO | WO-2019131116 A1 * | 7/2019 | | B60W 50/14 |

*Primary Examiner* — Abdhesh K Jha
(74) *Attorney, Agent, or Firm* — Carrier Blackman & Associates, P.C.; Joseph P. Carrier; William D. Blackman

(57) ABSTRACT

A vehicle control device is provided with a timing selection unit configured to select, during automated driving, either one of a first notification timing at which notification of a driving takeover request is issued in the case that a remaining distance to a scheduled switching point from the automated driving to manual driving has become less than or equal to a predetermined distance, and a second notification timing at which notification of the driving takeover request is issued in the case that a remaining time period until reaching the scheduled switching point is less than or equal to a predetermined time period, wherein the timing selection unit selects the first notification timing or the second notification timing based on a present travel speed or a scheduled travel speed.

6 Claims, 6 Drawing Sheets

(56) References Cited

U.S. PATENT DOCUMENTS

| | | | |
|---|---|---|---|
| 2015/0094899 A1* | 4/2015 | Hackenberg | B60W 50/082 701/23 |
| 2015/0253778 A1* | 9/2015 | Rothoff | B60W 50/14 701/25 |
| 2018/0329414 A1* | 11/2018 | Igarashi | B60W 40/08 |
| 2018/0356818 A1* | 12/2018 | Arai | B60Q 1/503 |
| 2019/0126942 A1* | 5/2019 | Goto | B60Q 9/00 |
| 2019/0186947 A1* | 6/2019 | Rockmore | B60W 50/14 |
| 2019/0187701 A1* | 6/2019 | Zheng | B60W 50/082 |
| 2020/0086907 A1* | 3/2020 | Breisinger | B60Q 9/00 |

* cited by examiner

VEHICLE CONTROL DEVICE

CROSS-REFERENCE TO RELATED APPLICATION

This application is based upon and claims the benefit of priority from Japanese Patent Application No. 2019-009848 filed on Jan. 24, 2019, the contents of which are incorporated herein by reference.

BACKGROUND OF THE INVENTION

Field of the Invention

The present invention relates to a vehicle control device that enables switching to manual driving (including automated driving in which monitoring by a driver is necessary, so-called conditional automated driving and driving assistance) by the driver upon receiving notification of a driving takeover request from a vehicle control unit during automated driving by the vehicle control unit (system).

Description of the Related Art

For example, in an "automated driving control device for a vehicle" as disclosed in Japanese Patent No. 3239727 (hereinafter referred to as JPB3239727), a determination is made as to whether or not a transition from automated driving to manual driving without driving assistance can be completed within a predetermined transition time period, and a notification is issued to the driver in accordance with the result of such a determination (see paragraph [0016] of JPB3239727). In accordance therewith, it is disclosed that it is possible to reliably switch over to manual driving at a desired point (same citation, paragraph [0017]).

On the other hand, in the event that the time period until a changeover switch is operated is too long, it is disclosed that the vehicle is forcibly made to decelerate and is stopped on the road side (same citation, paragraph [0016]).

SUMMARY OF THE INVENTION

However, with the technique disclosed in JPB3239727, whether or not it is possible to transition from automated driving to manual driving is determined by the predetermined transition time period, and therefore, a problem arises in that the time period during which automated driving is performed is disadvantageously shortened.

The present invention has been devised in consideration of such a problem, and has the object of providing a vehicle control device that enables a handover from automated driving to manual driving to be smoothly executed.

An aspect of the present invention is characterized by a vehicle control device that issues a notification of a driving takeover request to a driver from a vehicle control unit when switching from automated driving by the vehicle control unit to manual driving by the driver, the vehicle control device comprising a timing selection unit configured to select, during the automated driving, either one of a first notification timing at which notification of the driving takeover request is issued in a case that a remaining distance to a scheduled switching point from the automated driving to manual driving has become less than or equal to a predetermined distance, and a second notification timing at which notification of the driving takeover request is issued in a case that a remaining time period until reaching the scheduled switching point is less than or equal to a predetermined time period, wherein the timing selection unit selects the first notification timing or the second notification timing based on a present travel speed or a scheduled travel speed.

According to the present invention, by changing the notification timing of the driving takeover request in accordance with the travel speed, the handover from automated driving to manual driving can be smoothly executed.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control device according to the present invention will be presented and described in detail below with reference to the accompanying drawings.

[Configuration]

Figure 1:
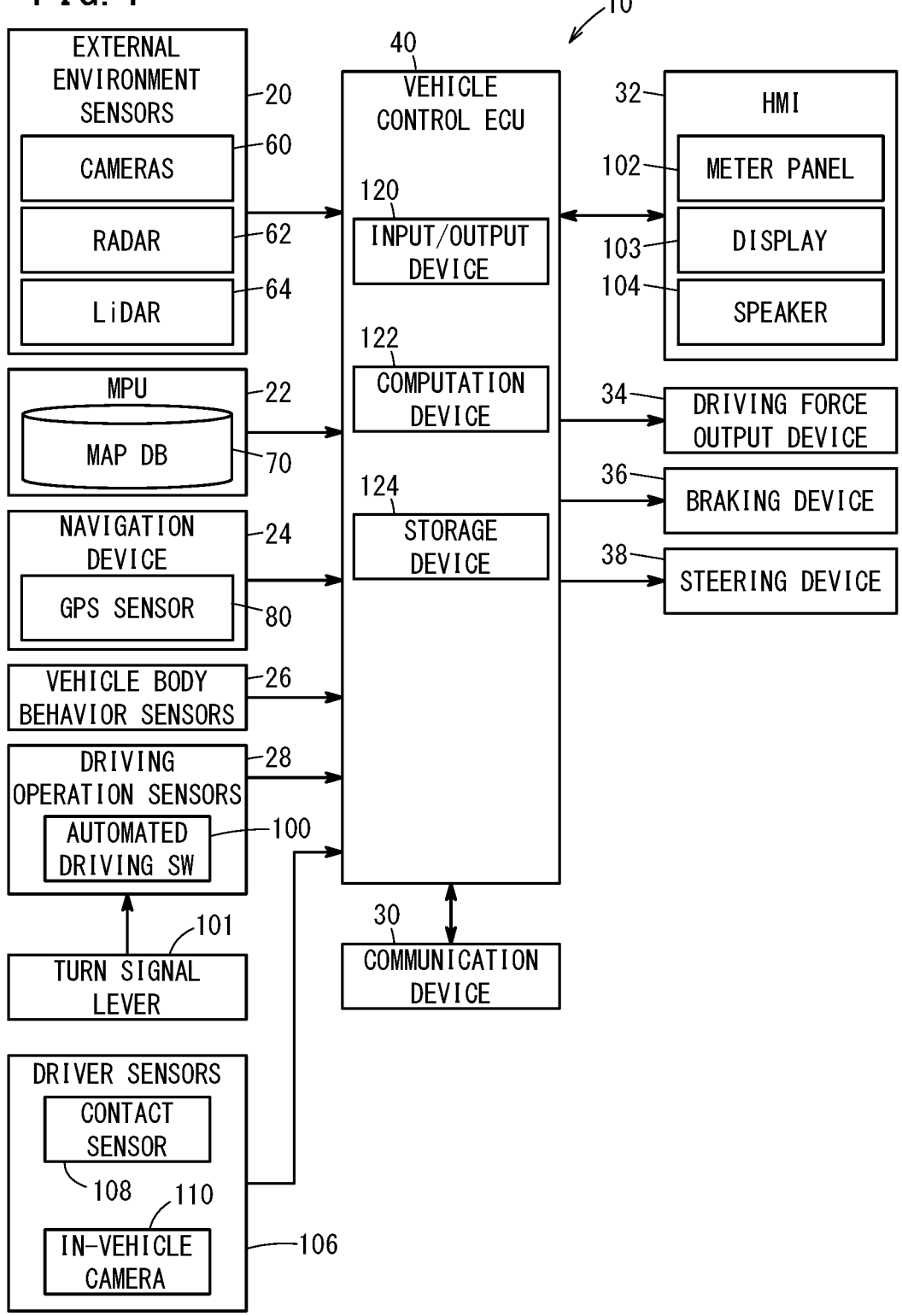
FIG. 1 is a schematic configuration block diagram of a vehicle including a vehicle control device according to a present embodiment.

FIG. 1 is a schematic configuration block diagram of a vehicle (also referred to as a "host vehicle") 12 equipped with a vehicle control device 10 according to a present embodiment.

The vehicle 12 is constituted from the vehicle control device 10, a driving force output device 34 controlled by the vehicle control device 10, a braking device 36, and a steering device 38.

The vehicle control device 10 basically includes external environment sensors 20, a map positioning unit (MPU) 22, a navigation device 24, vehicle body behavior sensors 26, driving operation sensors 28, driver sensors 106, a communication device 30, a human machine interface (HMI) 32, and a vehicle control ECU 40 also functioning as an automated driving control unit (an automated driving control unit or a vehicle control unit, also referred to as a so-called system).

The external environment sensors (external environment detection devices) 20 detect information concerning the external environment of the vehicle 12. The external environment sensors 20 include a plurality of cameras 60, a plurality of radar devices 62, and a plurality of LiDAR devices 64.

The plurality of cameras 60 output image information in relation to peripheral images captured of the periphery (front, sides, and rear) of the vehicle 12. The plurality of radar devices 62 output radar information indicative of reflected waves with respect to electromagnetic waves transmitted around the periphery (front, sides, and rear) of the vehicle 12. The plurality of LIDAR devices 64 continuously irradiate laser light in all directions of the vehicle 12, measure the three-dimensional positions of reflection points based on the reflected waves, and output such measurements as three-dimensional information.

The MPU 22 manages a map database (map) 70. Map information, which is of higher accuracy than the map information from the map database provided in the navigation device 24, is stored in the map 70. The MPU 22 provides the map information in response to a request from the navigation device 24 or the vehicle control ECU 40.

The navigation device 24 includes a satellite positioning system sensor, which in this instance is a GPS sensor 80. The GPS sensor 80 detects the current position of the vehicle 12. The navigation device 24 calculates a target route from the current position to a destination, and provides guidance to the vehicle occupant. When calculating the target route, the navigation device 24 acquires and utilizes the map information from the map database 70 included within the navigation device 24. The destination is input via a microphone or a display (display device) 103 which also functions as a touch panel.

The vehicle body behavior sensors 26 detect information (vehicle body behavior information) in relation to the behavior of the vehicle 12 (vehicle body). The vehicle body behavior sensors 26 include a vehicle speed sensor, an acceleration sensor, and a yaw rate sensor. The vehicle speed sensor detects the vehicle speed (current vehicle speed) Vj [km/h] and the forward direction of travel of the vehicle 12. The acceleration sensor detects the acceleration G [m/s$^2$] of the vehicle 12. The acceleration G includes a longitudinal acceleration, a lateral acceleration, and a vertical acceleration. The yaw rate sensor detects the yaw rate Y [rad/s] of the vehicle 12.

The driving operation sensors 28 include an automated driving switch (automated driving SW) 100, and detects information (driving operation information) in relation to driving operations made by the driver. The driving operation sensors 28 also include an accelerator pedal sensor, a brake pedal sensor, and a turn signal switch. The accelerator pedal sensor detects an operated amount [%] of the accelerator pedal. The brake pedal sensor detects an operated amount [%] of the brake pedal. The driving operation sensors 28 further include a steering angle sensor, a steering torque sensor, and the like. The turn signal switch detects operations of a turn signal lever 101.

The automated driving SW 100 is a switch for issuing instructions by operations of the vehicle occupant to both initiate and terminate the automated driving control. In addition to or in place of the automated driving SW 100, it is also possible to instruct the initiation or termination of the automated driving control by other methods (such as voice input via a microphone).

The driver sensors (vehicle occupant sensors) 106 include a contact sensor 108 made up from a capacitance sensor and/or a pressure sensor that detects (monitors) contact, grasping, or a pressure of the user (a vehicle occupant including the driver) applied to the steering wheel, and an in-vehicle camera 110 that monitors the vehicle occupant including the driver.

The communication device 30 performs wireless communications with external devices.

The HMI 32 accepts operations input from a vehicle occupant, together with presenting various information to the vehicle occupant visually, audibly, and tactilely. The HMI 32 includes a meter panel 102 equipped with a MID (Multi Information Display), the display 103, and a speaker 104.

The driving force output device 34 includes a travel drive source (an engine, a traction motor, etc.), and a drive electronic control device (drive ECU), neither of which are shown. The drive ECU adjusts the travel driving force of the vehicle 12 by controlling the travel drive source, based on an amount by which the accelerator pedal is operated, or a command from the vehicle control ECU 40.

The braking device 36 includes a brake motor and/or a hydraulic mechanism, a brake member, and a brake electronic control device (brake ECU). The braking device 36 may also serve to control engine braking by the engine and/or regenerative braking by the traction motor. The brake ECU controls the braking force of the vehicle 12 by causing a brake motor or the like to be operated, based on an amount by which the brake pedal is operated, or a command from the vehicle control ECU 40.

The steering device 38 includes an electric power steering (EPS) motor and an EPS electronic control unit (hereinafter referred to as an "EPS ECU"). The EPS ECU controls the steering angle of the vehicle 12 by controlling the EPS motor in accordance with operations of the steering wheel made by the driver or commands from the vehicle control ECU 40.

The vehicle control ECU 40 executes the automated driving control for driving the vehicle 12 to a destination without requiring driving operations (acceleration, deceleration, and steering) made by the driver, and includes a central processing unit (CPU). The vehicle control ECU 40 includes an input/output device 120, a computation device 122, and a storage device 124.

The input/output device 120 carries out input and output of information to and from devices (the sensors 20, 26, 28, and 106, etc.) other than the vehicle control ECU 40. The computation device 122 performs calculations on the basis of signals from the sensors 20, 26, 28, and 106, the communication device 30, the HMI 32, and the like. In addition, based on the results of such calculations, the computation device 122 generates signals with respect to the communication device 30, the HMI 32, the driving force output device 34, the braking device 36, and the steering device 38.

The storage device 124 stores programs and data used by the computation device 122. The storage device 124 includes RAMs (nonvolatile and volatile) and a ROM.

Figure 2:
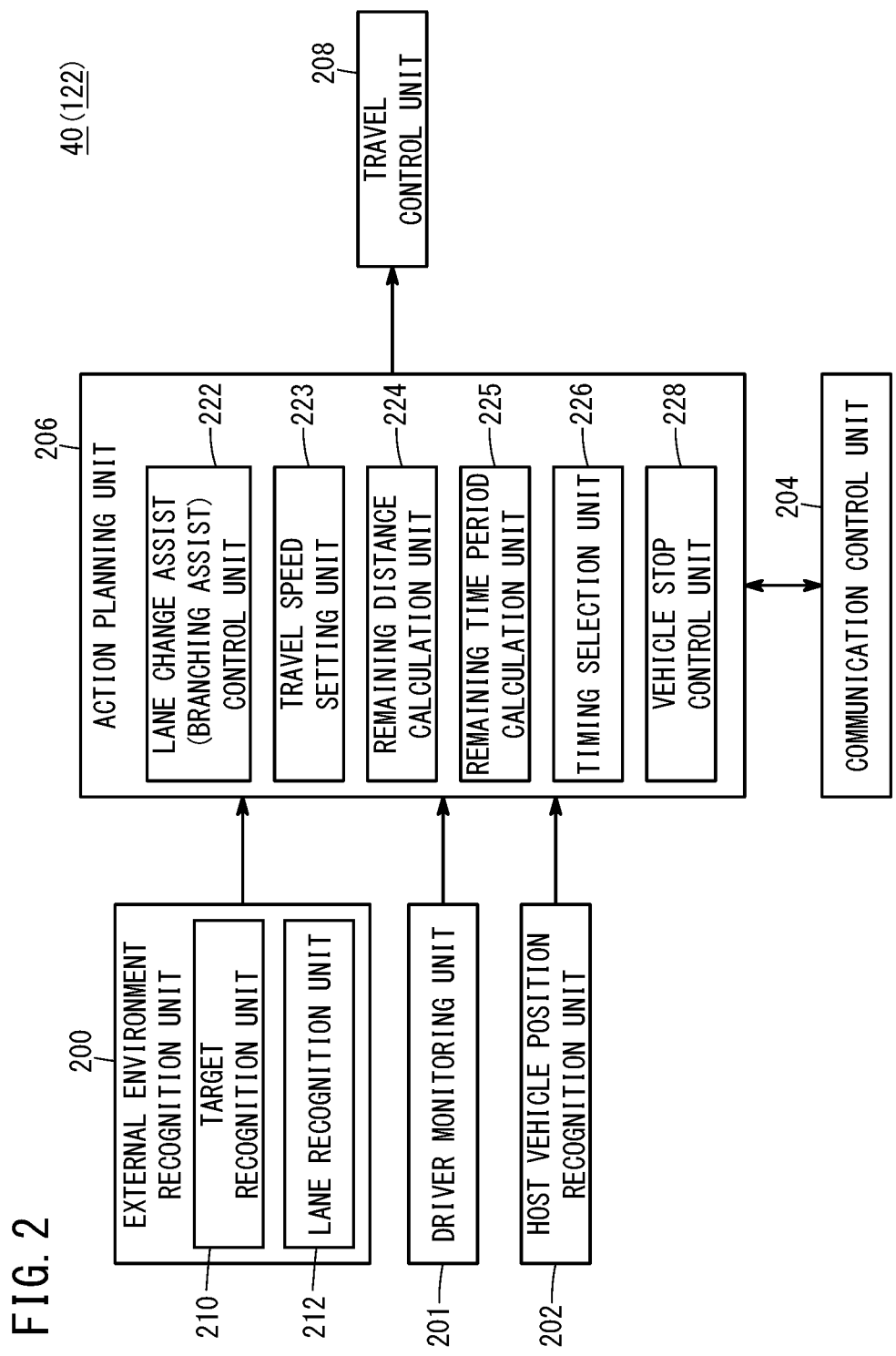
FIG. 2 is a block diagram showing constituent components of a computation device of a vehicle control ECU shown in FIG. 1.

FIG. 2 is a block diagram showing constituent components of the computation device 122 of the vehicle control ECU 40.

The computation device 122 of the vehicle control ECU 40 includes an external environment recognition unit 200, a driver monitoring unit 201, a host vehicle position recognition unit 202, a communication control unit 204, an action planning unit 206, and a travel control unit 208. Each of such respective units are realized by the computation device 122 (CPU, etc.) executing programs stored in the storage device 124 of the vehicle control ECU 40. Portions of the programs can also be constituted in the form of hardware.

On the basis of environmental information output from the external environment sensors 20, the external environment recognition unit 200 recognizes the circumstances and objects in the vicinity around the host vehicle 12. More specifically, the external environment recognition unit 200 includes a target recognition unit 210 and a lane recognition unit 212. Based on the image information from the cameras 60, the road environment as a whole, for example, in addition to the road shape, the road width, positions of lane markings, the number of lanes, the lane width, traffic signs, guidance signs, and the illuminated state of traffic signals and the like, the flow of traffic such as the situation of other vehicles traveling in the lanes, and lane branching points and the like are recognized.

The driver monitoring unit 201 monitors whether the driver is grasping (hands-on) or is not grasping (hands-off) the steering wheel on the basis of the output information from the capacitance detection type contact sensor 108, together with monitoring, on the basis of the output information from the in-vehicle camera 110, whether the driver is monitoring or is not monitoring the periphery of the vehicle, from the direction of the driver's face, the driver's line of sight, or the like.

The host vehicle position recognition unit 202 accurately recognizes the current position of the host vehicle 12 on the map 70 (local map) on the basis of the recognition results of the external environment recognition unit 200, the map information from the MPU 22, and the current position from the navigation device 24. The communication control unit 204 controls communications between the vehicle control ECU 40 and external devices.

The action planning unit 206 calculates a target trajectory of the host vehicle 12 to the destination that was input via the HMI 32. In addition, the action planning unit 206 determines a travel state of the host vehicle 12 based on the recognition results of the external environment recognition unit 200 and the host vehicle position recognition unit 202, as well as the detection results of the vehicle body behavior sensors 26, and by updating the target trajectory, formulates various actions for the host vehicle 12.

The target route calculated by the navigation device 24 serves to transmit the road along which traveling is to progress to the driver, and merely serves as relatively rough guidance information. In contrast thereto, the target trajectory calculated by the action planning unit 206 includes relatively fine content for controlling the acceleration, deceleration, and steering of the vehicle 12, in addition to the rough target route calculated by the navigation device 24.

Figure 3:
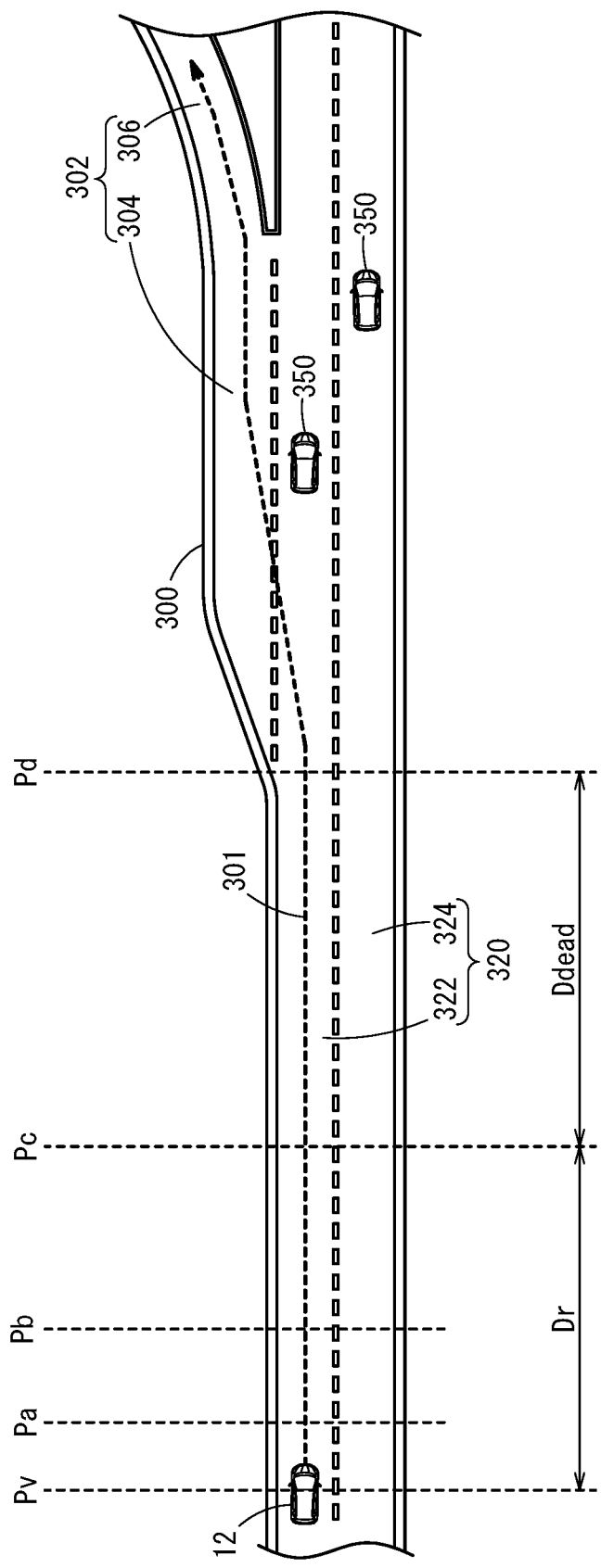
FIG. 3 is a schematic plan view showing in outline the state of a branching assist control, and which is provided for describing operations thereof.

FIG. 3 is a plan view schematically showing a situation (in the vicinity of an expressway branching lane) provided to describe exemplary operations of the vehicle control device 10.

The host vehicle 12, which is located at a current host vehicle position Pv prior to reaching a branching guidance sign position Pa where a branching guidance sign (direction guidance and distance guidance to a branching point reference position Pd) is provided roughly 2 [km] in front of the branching point reference position Pd at which a branching lane 302 starts, is traveling along a target trajectory 301 indicated by the dashed-line arrow and created by the action planning unit 206, and is about to pass the branching reference position Pd.

The expressway is indicative of a road in a country where it is decided that automobiles are to pass on the left side, and is composed of the branching lane 302 and a main line 320, provided in this order from the side of a road shoulder 300. It should be noted that the side of the opposing (oncoming) lane to the main line 320 is not illustrated.

The branching lane 302 is made up from an entry lane 304 and a rampway 306, provided in this order from a frontward side in the direction of travel. The branching lane 302 starts from the branching reference position Pd.

The main line 320 is made up from a travel lane (also referred to as a main line) 322, and an alternative lane 324, provided in this order from the left side facing toward the direction of travel.

According to the present embodiment, to an occupant of the host vehicle 12 which is traveling in the main line 320 under automated driving performed by the vehicle control ECU 40 (system), basically, a notification is issued at a notification position Pb of an appropriate driving takeover request (a takeover request from automated driving to driving assistance), and switching over to manual driving by the driver is permitted until reaching a deadline position (scheduled switching point) Pc of the driving takeover.

In this instance, the notification position Pb varies depending on the quantity of other vehicles 350, traffic conditions such as the presence or absence of a lane change, and the like. Moreover, in the present embodiment, in relation to manual driving, a lane change assist control unit 222 performs a lane change assist control or a branching assist control, on the condition that the driver is grasping (contacting) the steering wheel, and is monitoring the surrounding environment. In this sense, the lane change assist control unit 222 may also be referred to as a branching assist control unit 222.

The target recognition unit 210 (see FIG. 2) detects and recognizes external objects (external targets) existing around the periphery of the host vehicle 12. Among such external objects, there are included the road shoulder 300, other vehicles 350 as surrounding vehicles, and the like. Image information from the cameras 60 is used to detect the external objects. In addition to the image information from the cameras 60, radar information from the radar devices 62, and LiDAR information from the LiDAR devices 64 may be used. Alternatively, the other vehicles 350 may be detected by carrying out communications with the other vehicles 350 via the communication device 30. The cameras 60 may be stereo cameras which are capable of accurately detecting distance.

Using the image information of the cameras 60, the lane recognition unit 212 detects and recognizes the branching lane 302, in addition to the main line 320, which is made up of lanes existing around the periphery of the host vehicle 12. The lanes 302 and 320 may be detected using the current position of the host vehicle 12 and the map information.

The action planning unit 206 includes the lane change (branching) assist control unit 222, a travel speed setting unit 223, a remaining distance calculation unit 224, a remaining time period calculation unit 225, a timing selection unit 226, and a vehicle stop control unit 228.

The lane change (branching) assist control unit 222 assists the host vehicle 12 in making a lane change from the main line 322 into the branching lane 302, on the condition that the driver is grasping the steering wheel.

When making the lane change from the main line 322 into the branching lane 302, a driving takeover deadline position Pc is provided.

The distance from the branching reference position Pd to the driving takeover deadline position (deadline position) Pc is set to a deadline distance Ddead, which is determined beforehand on the basis of a present travel speed Vp or a scheduled travel speed Vs when passing through the branching reference position Pd.

The travel speed setting unit 223 sets the present travel speed Vp or the scheduled travel speed Vs when passing through the branching reference position Pd. The scheduled travel speed Vs may be an average speed from the present travel speed Vp until reaching the branching reference position Pd. According to the present embodiment, in order to facilitate understanding, unless otherwise specified, it is assumed that the present travel speed Vp and the scheduled travel speed Vs are the same speed.

Using the navigation device 24 and the map 70, the remaining distance calculation unit 224 calculates a distance (remaining distance) Dr from the host vehicle position Pv to the deadline position Pc.

On the basis of the remaining distance Dr and the present travel speed Vp or the scheduled travel speed Vs, the remaining time period calculation unit 225 calculates as a remaining time period Tr (Tr=Dr/Vp) the time period required to travel from the host vehicle position Pv to the deadline position Pc.

The branching assist control unit 222 determines whether or not the host vehicle position Pv has passed through the deadline position Pc, and on the condition of having not passed therethrough, and further that the driver is grasping the steering wheel, determines that the branching assist control is possible, and supplies an action plan (target trajectory 301, scheduled travel speed Vs, acceleration/deceleration information) concerned with the branching assist control to the travel control unit 208.

In the case that the host vehicle position Pv has passed through the deadline position Pc without the driver grasping the steering wheel, a determination is made that the branching assist control is impossible, and a notification to that effect is issued to the vehicle stop control unit 228.

Upon having received the notification to the effect that the branching assist control is impossible, the vehicle stop control unit 228 supplies to the travel control unit 208 an action plan (target trajectory, speed, acceleration/deceleration information) concerned with a vehicle stop control for causing the host vehicle 12 to be stopped at an emergency vehicle stop position (the road shoulder 300 or the like).

The travel control unit 208 calculates and transmits control commands with respect to the driving force output device 34, the braking device 36, and the steering device 38, on the basis of action plans (target trajectory 301, scheduled travel speed Vs, acceleration/deceleration information) supplied from the action planning unit 206. Stated otherwise, the travel control unit 208 controls the outputs of each of respective actuators that control the vehicle body behavior. Among such actuators, there are included the engine, the brake motor, and the EPS motor. By controlling the outputs of the actuators, the travel control unit 208 controls behavior amounts of the vehicle 12 (in particular, the vehicle body). The vehicle body behavior amounts referred to in this instance include, for example, the vehicle speed, the longitudinal acceleration, the steering angle, the lateral acceleration, and the yaw rate.

[Detailed Operations]

A description will be given with reference to the flowchart of FIG. 4 concerning detailed operations of the vehicle control device 10, which is configured and operates basically in the manner described above, and in particular, concerning operations of selecting the notification timing of the driving takeover request. Moreover, it is assumed that the host vehicle 12 is traveling by way of automated driving in the travel lane 322 at a position (current host vehicle position) Pv before having reached the branching guidance sign position Pa, and that the target trajectory 301 is a trajectory from the main line 320 to the branching lane 302 in accordance with route guidance that was set in advance using the navigation device 24.

In step S1, the travel speed setting unit 223 determines whether or not the present travel speed Vp satisfies either one of the conditions shown in the following expression (1) or (2).

$$120[km/h] < Vp < 135[km/h] \quad (1)$$

$$Vp < 79[km/h] \quad (2)$$

If the determination in step S1 is affirmative (step S1: YES), then in step S2, the remaining time period calculation unit 225 determines the remaining time period Tr (Tr=Dr/Vp) from the host vehicle position Pv until reaching the deadline position Pc. The timing selection unit 226 determines whether or not the calculated remaining time period Tr is less than or equal to a standard threshold time period Tth (Tth=60 [s]).

If the determination is negative and the standard threshold time period Tth is exceeded (step S2: NO, Tr>60 [s]), it is assumed that the notification position Pb of the driving takeover request has not been reached, and the process returns to step S1.

When the remaining time period Tr becomes less than or equal to the standard threshold time period Tth and the determination of step S2 is affirmative (step S2: YES, Tr≤60 [s]), then in step S3, the timing selection unit 226 determines to issue a notification that it is one minute prior to the driving takeover request.

On the other hand, if the determination of step S1 is negative (step S1: NO), or in other words, when the present travel speed Vp satisfies the following formula (3), the process proceeds to step S4.

$$80[km/h] \le Vp \le 120[km/h] \quad (3)$$

In step S4, the remaining distance calculation unit 224 calculates the remaining distance Dr from the host vehicle position Pv to the deadline position Pc, and the timing selection unit 226 determines whether or not the calculated remaining distance Dr is less than or equal to a standard threshold distance Dth (Dth=2 [km]).

If the determination is negative and the standard threshold distance Dth is exceeded (step S4: NO, Dr>2 [km]), it is assumed that the notification position Pb of the driving takeover request has not been reached, and the process returns to step S1.

On the other hand, when the remaining distance Dr has become less than or equal to the standard threshold distance Dth, and the determination of step S4 is affirmative (step S4: YES, Dr<Dth=2 [km]), then in step S5, the timing selection unit 226 determines to issue a notification that it is 2 km prior to the driving takeover request.

In the case it is determined in step S3 to issue the notification that it is one minute prior to the driving takeover request, or alternatively, in the case it is determined in step S5 to issue the notification that it is 2 km prior to the driving takeover request, then in step S6, the branching assist control unit 222 initiates notification (guidance) of the driving takeover request at the notification position Pb of the driving takeover request.

Moreover, in this case, the driving takeover request is a driving takeover request from automated driving, during which traveling is enabled through the travel control unit 208 by the action planning unit 206 which is monitored by the system, to branching assist controlled driving (manual driving) carried out through the travel control unit 208 by the action planning unit 206 based on the condition that the driver is grasping the steering wheel (that the driving status is being monitored by the driver).

Further, when the driver operates the automated driving switch 100 to OFF, manual driving is brought about in which the driving state is monitored by the driver.

Figure 5:
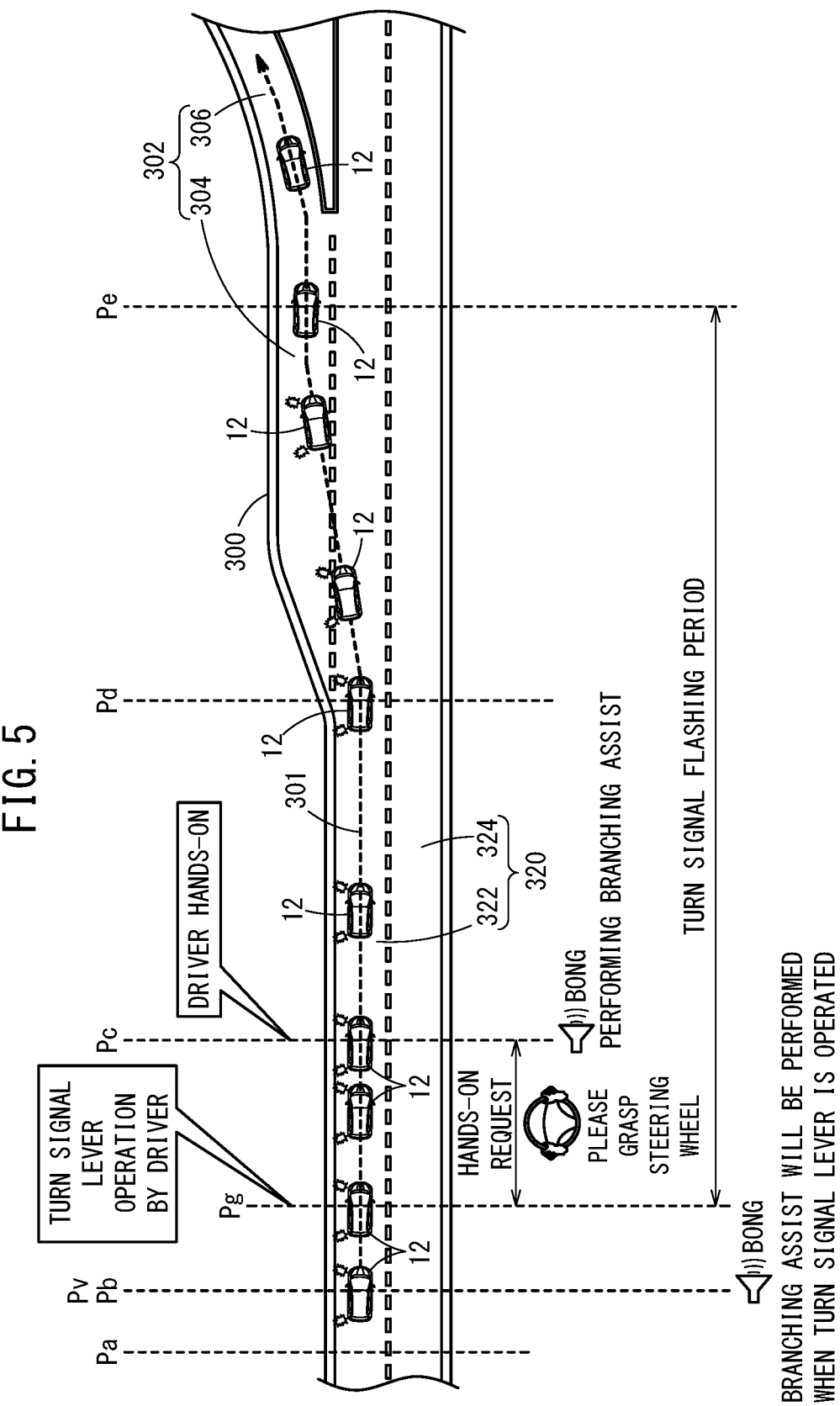
FIG. 5 is a schematic plan view showing in detail the state of a branching assist control, and which is provided for describing operations thereof.

Processing that takes place in step S6 and thereafter will be described with reference to FIG. 5.

When the current host vehicle position Pv during traveling of the host vehicle 12 arrives at the notification position of the driving takeover request (the notification position of it being one minute prior to the driving takeover request, or the notification position of it being 2 km prior to the driving takeover request) Pb, then in step S6, after a synthesized sound of "Bong" is issued from the branching assist control unit 222 through the speaker 104, a notification is issued by way of voice guidance that "Branching Assist Will be Performed When Turn Signal Lever is Operated". The notification of the driving takeover request may also be performed by way of the display 103 and/or by way of an indication on the meter panel 102.

After the notification position Pb, when it is detected that the turn signal lever 101 has been operated at the position Pg, blinking of the turn signal is initiated.

Next, in step S7, until reaching the deadline position Pc, a determination is made through the contact sensor 108 as to whether or not the driver has grasped the steering wheel.

In the case of not grasping the steering wheel, a hands-on request of "Please Grasp the Steering Wheel" (by way of voice through the speaker 104 and/or by way of a display on the display 103 or the meter panel 102) is continued until such grasping takes place, or until reaching the deadline position Pc at a maximum.

Until having reached the deadline position Pc, when it is detected by the contact sensor 108 that the driver has grasped the steering wheel (step S7: YES), then in step S8, the branching assist control (speed adjustment, steering adjustment, acceleration/deceleration adjustment) is carried out along the target trajectory 301 from the deadline position Pc.

More specifically, for example, when it is confirmed that the driver has grasped the steering wheel at the deadline position Pc, it is considered that the driver desires the branching assist control (the driver has expressed approval thereof), and a notification is issued by way of synthesized sound and voice (hereinafter, simply referred to as voice) "Bong . . . Performing Branching Assist" through the speaker 104.

As described above, according to the above-described embodiment, in the case it is determined that the present travel speed Vp or the scheduled travel speed Vs is a high vehicle speed in excess of 120 [km/h] (however, less than 135 [km/h]) (step S1: YES), then even if it is before the standard threshold distance Dth (Dth=2 km), if the standard threshold time period Tth (Tth=1 minute) has run out, the notification of the driving takeover request is issued (step S2: YES→step S3, step S6). The standard threshold time period Tth is set to an appropriate time period required for the driver, for whom branching assistance from the main line 320 into the branching lane 302 is offered, to grasp the steering wheel and recover the sensation of driving in the main line 320.

Further, in the case it is determined that the present travel speed Vp or the scheduled travel speed Vs is a standard speed between 80 [km/h] and 120 [km/h] (step S1: NO), then even if it is before the standard threshold time period Tth (Tth=1 minute), if the standard threshold distance Dth (Dth=2 km) has run out, the notification of the driving takeover request is issued (step S4: YES→step S5, step S6). Stated otherwise, the notification is generally issued in accordance with the branching point reference position guidance sign being displayed at 2 km prior to the branching point.

Moreover, in the case it is determined that the present travel speed Vp or the scheduled travel speed Vs is a low vehicle speed of less than 79 [km/h] (during traffic congestion, or when the main line 320 is a single lane or the like) (step S1: YES), then even if the standard threshold distance Dth (Dth=2 km) has run out, if the standard threshold time period Tth (Tth=1 minute) has run out without notification of the driving takeover request being issued, the notification of the driving takeover request is issued (step S2: YES→step S3, step S6). Stated otherwise, even during traffic congestion or the like, automated driving for as long a time as possible is provided up until one minute prior at the latest.

If it is detected in step S7 that the driver has not grasped the steering wheel at the deadline position Pc (step S7: NO), then in step S9, the vehicle stop control is carried out by the vehicle stop control unit 228.

In this case, the vehicle stop control unit 228 changes the target trajectory 301, and causes the vehicle 12 to come to a stop on the road shoulder 300 of the entry lane 304.

If it is detected in step S7 that the driver has grasped the steering wheel by the deadline position Pc (step S7: YES), then in step S8, the lane change (branching) assist control is executed until the lane change (branching) assist end position Pe.

[Modification]

Figure 6:
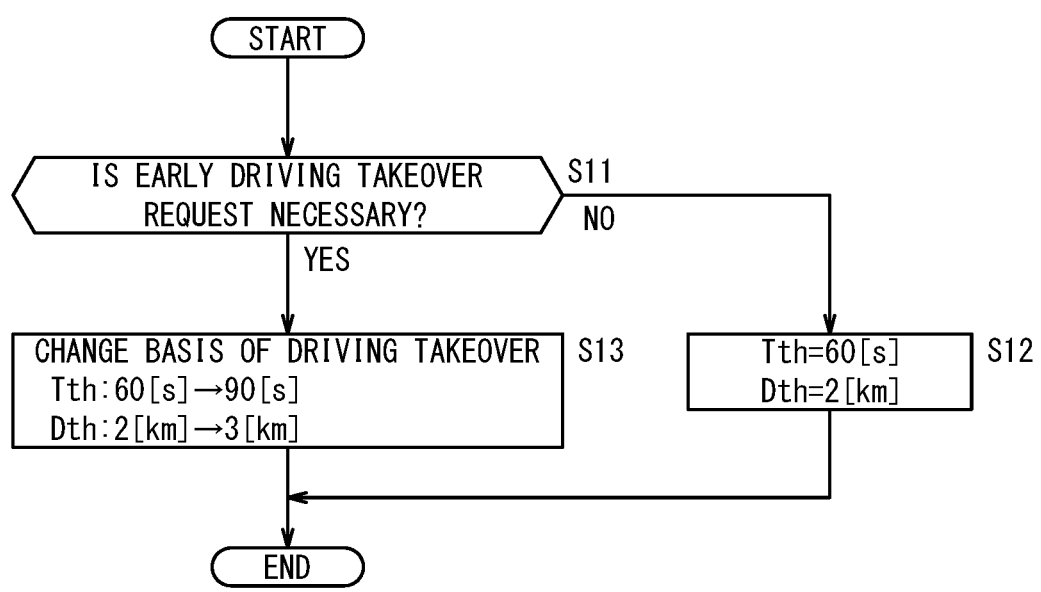
FIG. 6 is a flowchart provided to describe a modification of the embodiment.

A description of a modification will be given with reference to FIG. 6.

According to the above-described embodiment, the timing selection unit 226 determines whether or not the calculated remaining distance Dr is less than or equal to the standard threshold distance Dth (Dth=2 [km]), or alternatively, determines whether or not the calculated remaining time period Tr is less than or equal to the standard threshold time period Tth (Tth=60 [s]). However, according to the modification, the threshold distance Dth and the threshold time period Tth are changed in step S11, depending on whether or not it is necessary to notify the driver of an early driving takeover request.

More specifically, concerning cases in which it is necessary to notify the driver of an early driving takeover request (step S11: YES), firstly, there may be a case when the host vehicle 12 that is currently traveling in the alternative lane 324 is in a situation in which it is necessary to make a lane change into the travel lane 322 by the branching reference position Pd where the entry lane 304 of the branching lane 302 starts. Secondly, there may be a case when it is difficult to make a lane change due to the positional relationship of other surrounding vehicles 350. Thirdly, there may be a case when other vehicles 350 are forming a line along the road shoulder 300 of the travel lane 322 in front of the entry lane 304. Fourthly, there may be a case when, from the communication control unit 204 that is linked to the cloud, the timing of a hands-on history of another vehicle 350 for which the branching assist has been performed previously is earlier.

In any of such cases, in step S13, the basis for the driving takeover is changed in the following manner.

The threshold time period Tth is delayed by roughly 1.5 times from 60 [s] to 90 [s]. The threshold distance Dth is lengthened by roughly 1.5 times from 2 [km] to 3 [km].

Figure 4:
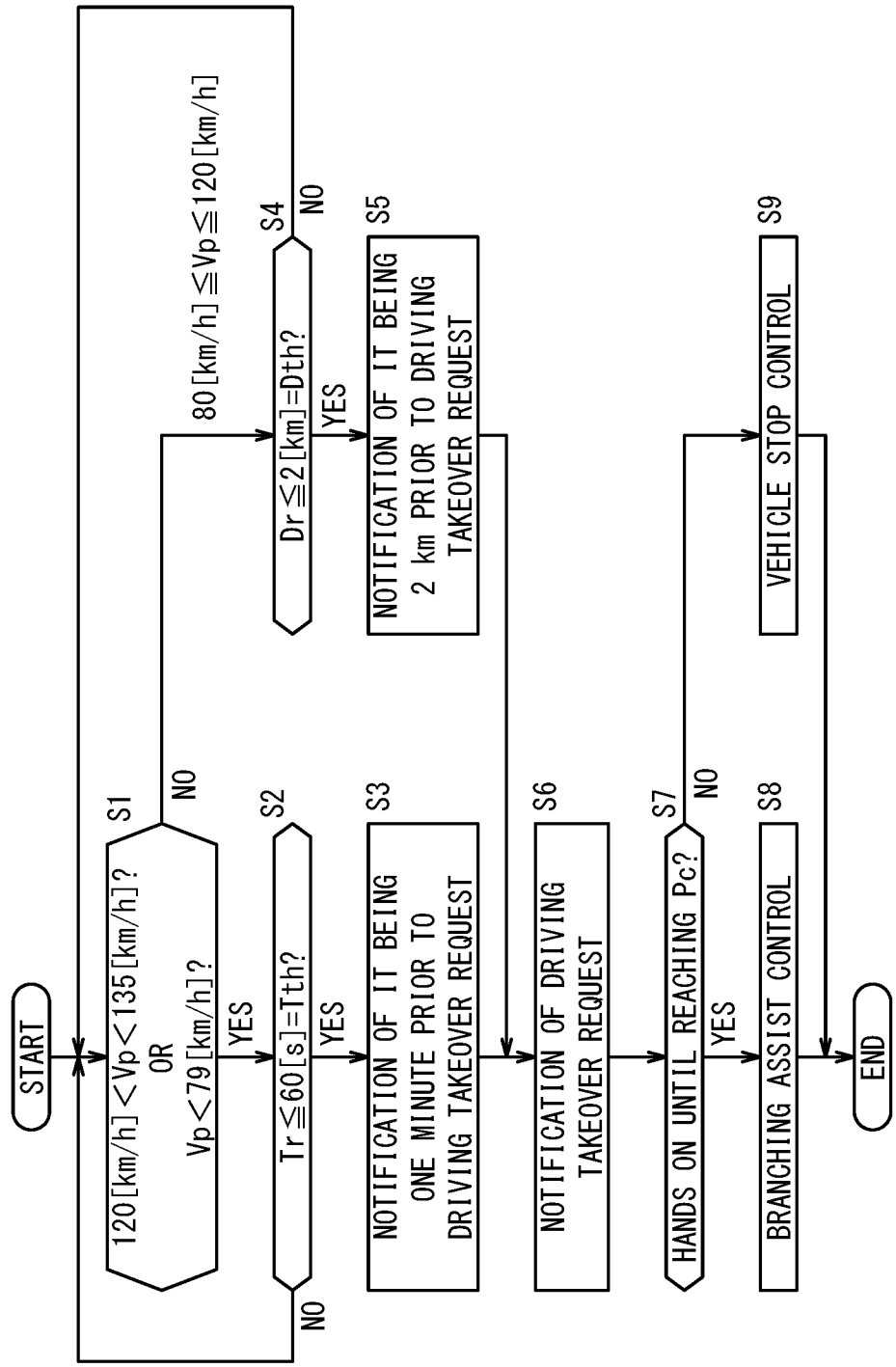
FIG. 4 is a flowchart provided to describe operations of the vehicle control device.

The threshold time period Tth and the threshold distance Dth are changed to such reference values in steps S2 and S4, and then the process according to the flowchart of FIG. 4 is performed.

Moreover, in the case that notification of an early driving takeover (step S11: NO) is unnecessary, the process according to the flowchart of FIG. 4 is performed without the threshold distance Dth and the threshold time period Tth being changed, and remaining at Dth=2 [km] and Tth=60 [s], respectively (step S12).

[Invention that can be Grasped from the Embodiment]

In this instance, the invention that can be grasped from the above-described embodiment will be described below. Although for convenience of understanding, the reference numerals used in the embodiment are written in parentheses together with the constituent elements, the constituent elements are not limited to the features to which such reference numerals pertain.

The vehicle control device (10) according to the present invention issues a notification of a driving takeover request to a driver from the vehicle control unit (40) when switching from automated driving by the vehicle control unit (40) to manual driving by the driver, the vehicle control device (10) comprising:

the timing selection unit (226) that selects, during the automated driving, either one of the first notification timing (step S5) at which notification of the driving takeover request is issued in the case that a remaining distance (Dr) to a scheduled switching point (Pc) from the automated driving to manual driving has become less than or equal to a predetermined distance (Dth), and a second notification timing (step S3) at which notification of the driving takeover request is issued in the case that a remaining time period (Tr) until reaching the scheduled switching point (Pc) is less than or equal to a predetermined time period (Tth), wherein the timing selection unit (226) selects the first notification timing (step S5) or the second notification timing (step S3) on the basis of the present travel speed (Vp) or the scheduled travel speed (Vs).

In the foregoing manner, by changing the notification timing of the driving takeover request in accordance with the travel speed (Vp, Vs), the handover from automated driving to manual driving can be smoothly executed.

In this case, the timing selection unit (226):

may issue the notification of the driving takeover request at the second notification timing (step S3), in the case that the present travel speed (Vp) or the scheduled travel speed (Vs) exceeds the first threshold value (120 [km/h]), and may issue the notification of the driving takeover request at the first notification timing (step S5), in the case that the present travel speed (Vp) or the scheduled travel speed (Vs) is less than the first threshold value (120 [km/h]).

In accordance with this feature, in the case that the present travel speed Vp (or the scheduled travel speed Vs) exceeds the first threshold value (120 [km/h]), the driving takeover request is issued at the second notification timing (predetermined time period (Tth)), whereby it is possible to travel with leeway to the scheduled switching point (Pc). Further, in the case that the present travel speed Vp (or the scheduled travel speed Vs) is less than the first threshold value (120 [km/h]), the driving takeover request is issued at the first notification timing (predetermined distance (Dth)), whereby it is possible to smoothly takeover responsibility for driving by the scheduled switching point (Pc).

Further, the timing selection unit (226):

may issue the notification of the driving takeover request at the first notification timing (step S5), in the case that the present travel speed (Vp) or the scheduled travel speed (Vs) is less than the first threshold value (120 [km/h]), and exceeds the second threshold value (80 [km/h]) (step S1: NO) which is smaller than the first threshold value (120 [km/h]); and may issue the notification of the driving takeover request at the second notification timing (step S3), in the case that the present travel speed (Vp) or the scheduled travel speed (Vs) is less than the second threshold value (80 [km/h]) (step S1: YES).

In accordance with this feature, in the case that the present travel speed Vp (or the scheduled travel speed Vs) is less than the first threshold value (120 [km/h]), and exceeds the second threshold value (80 [km/h]) which is smaller than the first threshold value (120 [km/h]), the notification of the driving takeover request is issued at the first notification timing (predetermined distance (Dth)) (step S5), whereby it is possible to smoothly takeover responsibility for driving at the scheduled switching point Pc. Further, in the case that the present travel speed Vp (or the scheduled travel speed Vs) is less than the second threshold value (80 [km/h]), the notification of the driving takeover request is issued at the second notification timing (predetermined time period (Tth)), whereby automated driving can be continued for a longer time.

Furthermore, the predetermined distance (Dth) by which the first notification timing (step S5) is determined and the predetermined time period (Tth) by which the second notification timing (step S3) is determined may be adjusted based on a number of lane changes, a number of surrounding vehicles, a positional relationship with the surrounding vehicles, or based on a predetermined transition time period (step S11) from the notification of the driving takeover request to execution of the driving takeover.

In accordance with this feature, for example, under a situation in which the time required for the driving takeover becomes long, the notification can be issued earlier.

Furthermore, the scheduled travel speed Vs may be changed based on a set speed, traffic congestion information, a presence or absence of a preceding vehicle, or a number of preceding vehicles.

In accordance with this feature, the scheduled travel speed Vs can be set correctly.

Further still, in the case that the driving takeover is not carried out within the predetermined distance (Dth) or within the predetermined time period (Tth) after having issued the notification of the driving takeover request (step S7: NO), the automated driving is terminated, and an automated vehicle stop control for the vehicle 12 (step S9) is performed.

In accordance with this feature, even in the case that the driving takeover is not carried out, the vehicle 12 can be made to reliably transition into a state of being automatically stopped.

The present invention is not limited to the above-described embodiment, and it goes without saying that various alternative or additional configurations could be adopted therein based on the descriptive content of the present specification.

What is claimed is:

1. A vehicle control device that issues a notification of a driving takeover request to a driver from a vehicle control unit when switching from automated driving by the vehicle control unit to manual driving by the driver, the vehicle control device comprising:

a timing selection unit configured to select, during the automated driving, either one of a first notification timing at which notification of the driving takeover request is issued in a case that a remaining distance to a scheduled switching point from the automated driving to manual driving has become less than or equal to a predetermined distance, and a second notification timing at which notification of the driving takeover request is issued in a case that a remaining time period until reaching the scheduled switching point is less than or equal to a predetermined time period, wherein the timing selection unit selects the first notification timing or the second notification timing based on a present travel speed or a scheduled travel speed.

2. The vehicle control device according to claim 1, wherein the timing selection unit:
   issues the notification of the driving takeover request at the second notification timing, in a case that the present travel speed or the scheduled travel speed exceeds a first threshold value; and
   issues the notification of the driving takeover request at the first notification timing, in a case that the present travel speed or the scheduled travel speed is less than the first threshold value.

3. The vehicle control device according to claim 2, wherein the timing selection unit:
   issues the notification of the driving takeover request at the first notification timing, in a case that the present travel speed or the scheduled travel speed is less than the first threshold value, and exceeds a second threshold value which is smaller than the first threshold value; and
   issues the notification of the driving takeover request at the second notification timing, in a case that the present travel speed or the scheduled travel speed is less than the second threshold value.

4. The vehicle control device according to claim 1, wherein the predetermined distance by which the first notification timing is determined and the predetermined time period by which the second notification timing is determined are adjusted based on a number of lane changes, a number of surrounding vehicles, a positional relationship with the surrounding vehicles, or based on a predetermined transition time period from the notification of the driving takeover request to execution of the driving takeover.

5. The vehicle control device according to claim 1, wherein the scheduled travel speed is changed based on a set speed, traffic congestion information, a presence or absence of a preceding vehicle, or a number of preceding vehicles.

6. The vehicle control device according to claim 1, wherein, in a case that the driving takeover is not carried out within the predetermined distance or within the predetermined time period after having issued the notification of the driving takeover request, the automated driving is terminated, and an automated vehicle stop control for a vehicle is performed.

* * * * *